United States Patent
Yasutomi

(10) Patent No.: US 7,643,179 B2
(45) Date of Patent: Jan. 5, 2010

(54) IMAGE FORMING APPARATUS AND IMAGE FORMING METHOD

(75) Inventor: Kei Yasutomi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 593 days.

(21) Appl. No.: 11/595,412

(22) Filed: Nov. 9, 2006

(65) Prior Publication Data
US 2007/0103730 A1    May 10, 2007

(30) Foreign Application Priority Data
Nov. 9, 2005 (JP) .............................. 2005-325150
Apr. 20, 2006 (JP) .............................. 2006-116771

(51) Int. Cl.
*H04N 1/405* (2006.01)
(52) U.S. Cl. ..................... 358/3.2; 358/1.9; 358/536
(58) Field of Classification Search ............... 358/534, 358/535, 536, 500, 501, 504, 518, 1.1, 1.9, 358/3.06, 3.2; 382/162, 167
See application file for complete search history.

(56) References Cited

U.S. PATENT DOCUMENTS

| | | | | | |
|---|---|---|---|---|---|
| 4,924,301 | A | * | 5/1990 | Surbrook ..................... | 358/534 |
| 5,019,896 | A | * | 5/1991 | Shimazaki .................... | 358/534 |
| 5,045,931 | A | * | 9/1991 | Sakamoto ..................... | 358/534 |
| 5,202,772 | A | * | 4/1993 | Muir .......................... | 358/1.9 |
| 5,404,156 | A | * | 4/1995 | Yamada et al. ................ | 347/115 |
| 5,469,266 | A | * | 11/1995 | Usami et al. ................. | 358/1.9 |
| 5,546,197 | A | * | 8/1996 | Shibazaki et al. ............ | 358/534 |
| 5,680,222 | A | * | 10/1997 | Ashworth ..................... | 358/3.16 |
| 6,608,702 | B1 | * | 8/2003 | Urasawa ...................... | 358/3.2 |
| 2005/0002048 | A1 | * | 1/2005 | Takahashi et al. ............ | 358/1.9 |

FOREIGN PATENT DOCUMENTS

| | | |
|---|---|---|
| JP | 2002-112047 | 4/2002 |
| JP | 2003-260813 | 9/2003 |
| JP | 2004-354500 | 12/2004 |
| JP | 2005-077972 | 3/2005 |

OTHER PUBLICATIONS

Kawamura, N.: "Image Processing for Haltone Reproduction" Electrophotography, vol. 24, No. 1 (1985) pp. 51-59, English Translation.

* cited by examiner

*Primary Examiner*—Thomas D Lee
(74) *Attorney, Agent, or Firm*—Blakely, Sokoloff, Taylor & Zafman LLP

(57) ABSTRACT

A disclosed image forming apparatus for recording images includes: an image processing unit to create toner image data on four colors of yellow (Y), cyan (C), magenta (M), and black (K) such that toner images have line-shaped periodic structures; and an image forming unit to form the toner images using coloring materials of the four colors and superposing the toner images on a recording medium, wherein the line-shaped periodic structures of the toner images of the four colors are determined based on screen ruling of 200.0, 180.3, 180.3, and 200.0 for Y, C, M, and K colors and screen angles of 0.0, 146.3, 33.7, and 90.0 for Y, C, M, and K colors.

8 Claims, 13 Drawing Sheets

FIG.1A
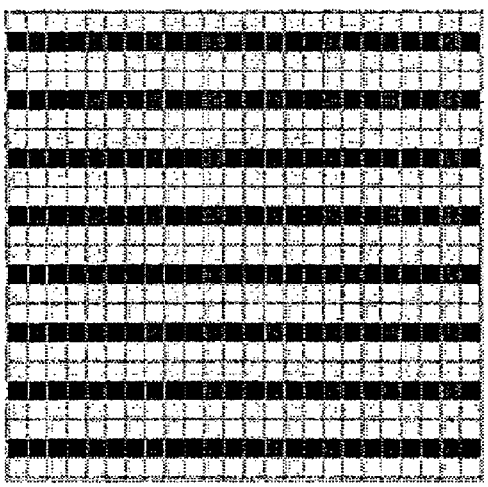
Y COLOR
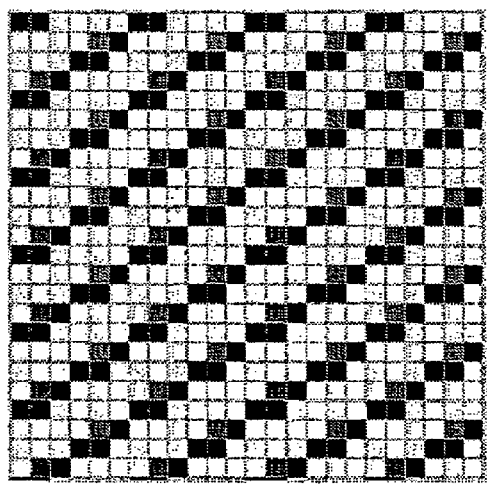
C COLOR
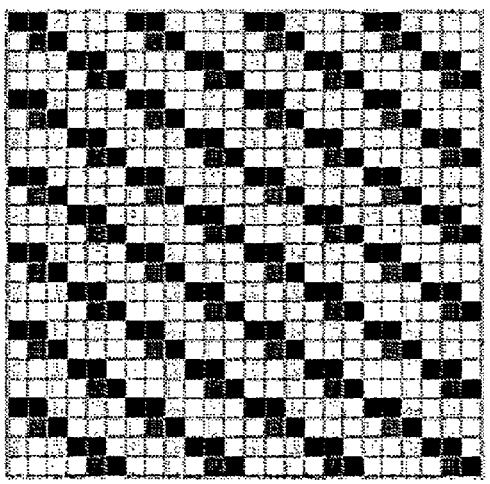
M COLOR
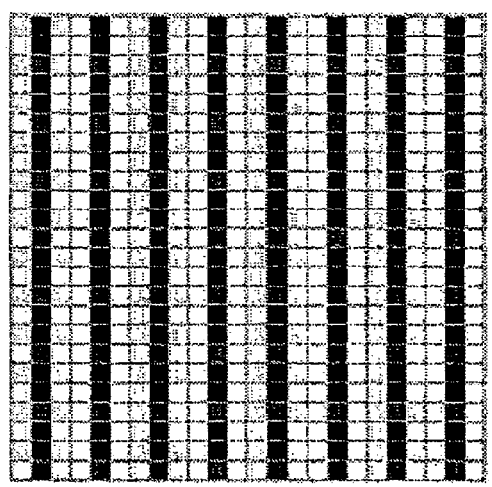
K COLOR FIG.1B
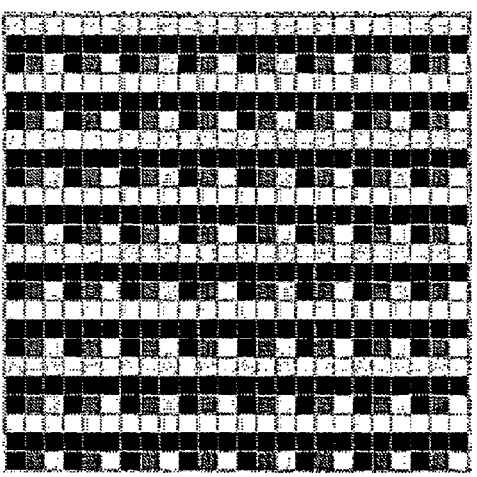
Y COLOR
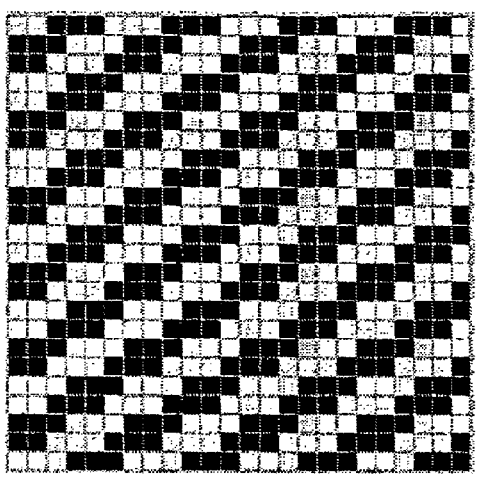
C COLOR
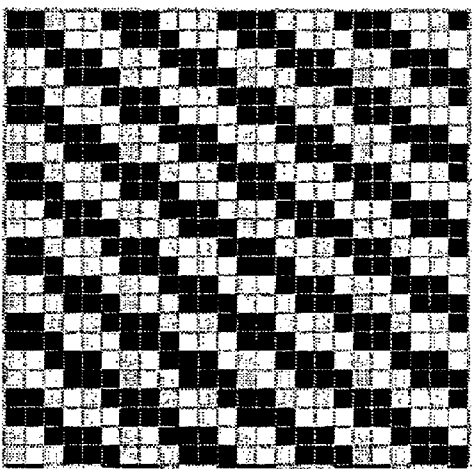
M COLOR
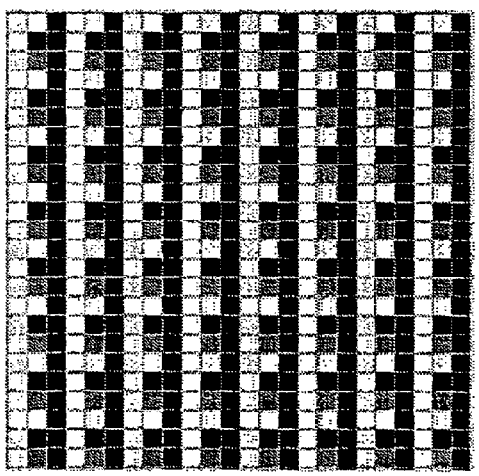
K COLOR MAIN VECTOR : $\vec{\alpha}_0 = (\alpha_{0x}, \alpha_{0y}) = (-1, 2)$ SUB-VECTOR : $\vec{\alpha}_1 = (\alpha_{1x}, \alpha_{1y}) = (3, 2)$ SCREEN RULING = (RESOLUTION) $\times \sqrt{\alpha_{0x}^2 + \alpha_{0y}^2} \Big/ \sqrt{|\alpha_{0x}\alpha_{1y} - \alpha_{0y}\alpha_{1x}|}$ SCREEN ANGLE = atan2($\alpha_{0y}, \alpha_{0x}$)

FIG.8A
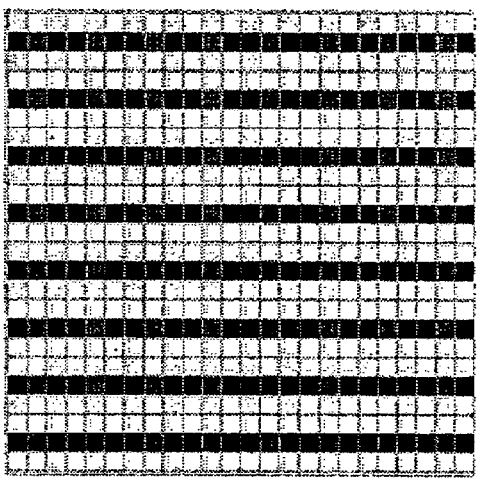
Y COLOR
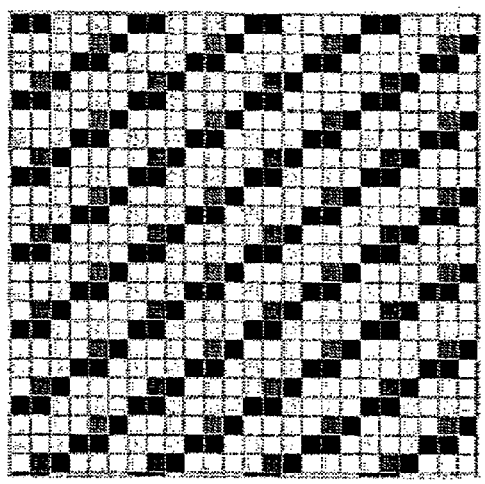
C COLOR
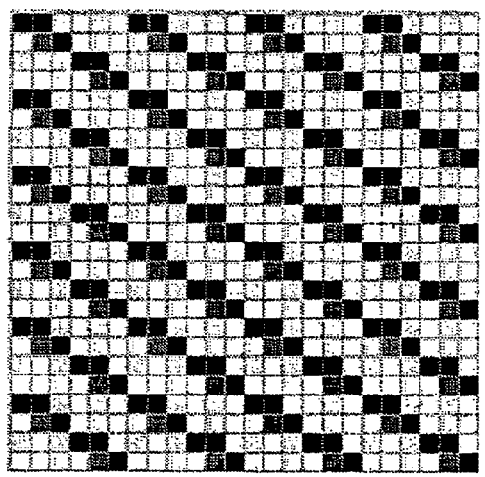
M COLOR
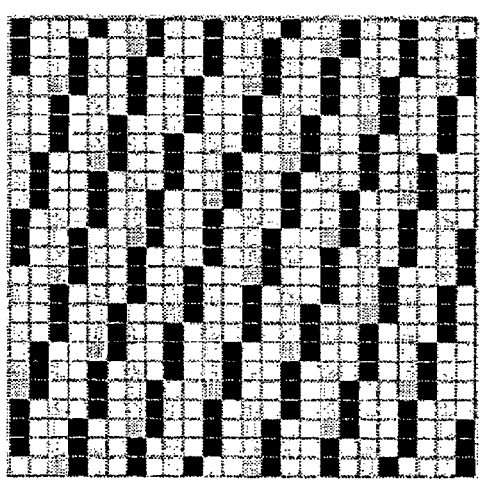
K COLOR

IMAGE FORMING APPARATUS AND IMAGE FORMING METHOD

PRIORITY

The present application is based on Japanese priority applications No. 2005-325150, filed Nov. 9, 2005 and No. 2006-116771, filed Apr. 20, 2006, the entire contents of which are hereby incorporated herein by reference.

BACKGROUND OF THE INVENTION

1. Field of the Invention

The present invention generally relates to an electrophotographic color image forming apparatus and an image forming method, and more particularly to techniques suitable for a color offset printing system and an image forming apparatus using laser writing/silver halide imaging.

2. Description of the Related Art

Image data to be input to an image forming apparatus has multivalued data ranging from 8 to 12 bits per pixel in gradation images such as photographs. By contrast, the image forming apparatus (including an electrophotographic image forming apparatus) for forming an image on paper (namely, hard copy) practically has a very small number of gradations that can be expressed per pixel. In order to solve such a problem, hard-copy devices increase resolution thereof to 600 dpi or 1200 dpi, for example, and display pseudo-halftone images by modulating image density in terms of area using plural pixels. Pseudo-halftone processing refers to image processing performed by converting input image data to a pseudo-halftone image.

Details of processing for quantizing the multivalued image data in the dither method are described in Electrophotography, Vol. 24, No. 1 (1985) p. 51-59, for example, so that the description is omitted in the present specification. Images subjected to dither processing have periodic structures. Further, color images are formed by superposing plural toner images (full-color images are generally formed by superposing four colors, namely, Y: yellow, C: cyan, M: magenta, and K: black). In addition, these images of four colors are subjected to sets of dither processing differing to one another and the toner images have different periodic structures. In the past, in some cases, the images of four colors are subjected to dither processing such that the toner images have the same periodic structure. However, in such cases, colors tend to change depending on fluctuation of positions where colors are superposed, so that this type of dither processing is not usually used today. Nowadays, a method usually used is capable of avoiding the generation of such a problem and the images of four colors are processed to have different periodic structures (screen ruling and screen angles are shifted). This method has been widely used in the field of printing and followed by the field of hard copying other than printing such as electrophotography.

Types of dither matrices are classified into (1) Dot screen type, (2) Bayer type, and (3) Line screen type. In comparison with the dot screen type dither matrices, the line screen type dither matrices have the following merits. In the dot screen type dither matrices, the periodic structure of a growth center is required to have a substantially square shape, so that a degree of freedom for screen ruling and screen angles defining the dither matrices is limited. By contrast, in the line screen type dither matrices, the periodic structure of a growth center may be a rectangle or a parallelogram without causing any difference in comparison with the case of the square shape, so that it is possible to increase the number of combinations (degree of freedom in selection) of the screen ruling and the screen angles.

In the method for superposing toner images having different periodic structures regarding the images of four colors, a phenomenon may be generated as if waves were superposed and interference patterns referred to as beat may be observed. The interference patterns are referred to as "color moiré". When the color moiré is generated in a low frequency area (frequency of beat is low) and visually recognized, the color moiré brings discomfort to a user and may become a factor in degradation of image quality. Usually, a combination method is selected such that this color moiré generated when the images of four colors are superposed is not visually noticeable as much as possible (frequency of moiré is high) and dither matrices used for dither processing in four colors are determined. However, there is no established method for maintaining balance of color moiré for all colors (superposition of all the CMYK colors), so that combinations empirically determined as suitable are widely employed.

Currently, combinations of dither matrices widely used for four colors are determined by a method for arranging the four colors of C, M, Y, and K widely employed for industrial printing apparatuses as shown in FIGS. 2 and 3. In this method, screen angles are set such that Y color is set to have a screen angle of 0 degree, C color is 15 degrees, K color is 45 degrees, and M color is 75 degrees (although screen ruling is not limited, 175 lpi or so is used for the each of the CMYK colors in the same manner). In order to strictly realize the screen angles, a resolution of not less than 2400 dpi is necessary, so that when the resolution is less than 2400 dpi, other screen angles which can be realized and are close to the above-mentioned screen angles are selected (FIG. 3 corresponds to a case where the above-mentioned screen arrangement is formed using the resolution of 2400 dpi). Further, in this arrangement method, the periodic structure has a square shape and halftone dot shapes are based on the dot screen type, so that an angle shifted by 90 degrees relative to each screen angle has an equivalent directional axis. In this combination, by making use of the fact that color moiré generated between Y color and CM colors is not noticeable, difference of screen angles between Y color and CM colors is set as 15 degrees (in the field of printing, color moiré generated between Y color and other CMK colors is considered to be small). In addition, well-known techniques to eliminate color moiré generated by superposing toner images of plural colors with periodic structures include Japanese Laid-Open Patent Application No. 2002-112047, for example.

However, it is difficult to determine a combination of dither matrices for the four CMYK colors (hereafter, a combination of dither matrices for the four colors is referred to as a dither set) since there is no established method as mentioned above. In particular, it is very difficult to develop a preferable dither set other than empirically known dither sets.

An optical writing device of an electrophotographic image forming apparatus scans a photoconductor and forms an electrostatic latent image in which a beam is irradiated from a semiconductor laser, optically modulated, and reflected on a face of a polygon mirror rotating at a high speed. In this scanning method using the polygon mirror, it is known that a beam position on the photoconductor is changed in what is called a sub-scanning direction (movement direction of the rotating photoconductor). This problem is generally referred to as "surface tilt". Causes of the surface tilt include a tilt of a face of the polygon mirror relative to a motor rotating shaft, fluctuation of a tilt of each face of the polygon mirror (tilt relative to a rotating shaft, namely, a surface tilt angle), or the like. For example, Japanese Laid-Open Patent Application No. 2003-260813 discloses measures for surface tilt.

Usually, in order to reduce the above-mentioned surface tilt, an optical system of the optical writing device is disposed such that there is a conjugate relationship between faces of the polygon mirror and a face of a photoconductor drum. This method is generally known as a function for preventing surface tilt. However, even when the surface tilt preventing function is used, a position of a beam incident on the polygon mirror is different depending on a scanning position (position in a main scanning direction), so that it is difficult to completely eliminate the change of a writing position in the sub-scanning direction resulting from the surface tilt. As a result, the change of a writing position is generated. In accordance with the surface tilt, an uneven pitch (unevenness of scanning intervals in the sub-scanning direction) is generated, which has a space period based on the number of faces of the polygon mirror in the sub-scanning direction. In this case, an uneven density corresponding to the unevenness of pitch is generated in an image. This is recognized by the user (when the pitch of the uneven density is large and visually noticeable) and becomes a factor in degradation of image quality as an abnormal image.

A method for eliminating color moiré disclosed in Japanese Laid-Open Patent Application No. 2002-112047 employs a method for shifting only those phases while using the same periodic structure (the same screen ruling and screen angles) for Y color and one of CMK colors. However, this method is available only when positional accuracy of superposed colors is high, so that when positional displacement of the superposed colors is large (about 10% of a single period of dithering), a tone of an output image is changed because of the positional displacement of the superposed colors. In other words, differing from the above-mentioned method by which the change of a tone is eliminated by shifting screen angles, this method is not a fundamental solution to the positional accuracy of the superposed colors.

Further, although a method disclosed in Japanese Laid-Open Patent Application No. 2003-260813 is assumed to be preferable in terms of color moiré, the number of combinations of dithering for the CMYK colors is two and other combination is not disclosed, for example. Further, Japanese Laid-Open Patent Application No. 2003-260813 discloses no description regarding what combination is preferable in terms of color moiré.

In accordance with the above-mentioned description, it is understood that there is no established method for determining a combination for the four CMYK colors so as not to generate color moiré and that it is very difficult to develop a dither set preferable in terms of color moiré.

As mentioned above, by using line screen type dither matrices in order to constitute the dither set, it is possible to increase the number of combinations (degree of freedom in selection) of the screen ruling and the screen angles (since the degree of freedom is improved, possibilities of combination preferable in terms of color moiré are increased). In the case of the dot screen type dithering, it is necessary to set directional axes (axes parallel with vectors indicating periodic structures) for the four CMYK colors in a range of 90 degrees, since the directional axes are present at intervals of 90 degrees in the dot screen type dither matrices. By contrast, in the line screen type dither matrices, it is sufficient to set directional axes for the four CMYK colors in a range of 180 degrees, since the directional axes are present at intervals of 180 degrees in the line screen type dither matrices. Thus, it is possible to have larger screen angles among the CMYK colors in comparison with the dot screen type dithering. As a result, the line screen type dithering is more likely to obtain images preferable in terms of moiré.

However, upon selecting dither sets, it is very difficult to try all combinations because there are tens of thousands of combinations. Thus, in practice, combinations of dither matrices (referred to as dither sets) for the CMYK colors empirically determined as suitable are used. In other words, it is not easy to select a combination preferable in terms of color moiré by combining the line screen type dithering.

SUMMARY OF THE INVENTION

An image forming apparatus and image forming method are described. In one embodiment, an image forming apparatus for recording images, comprises an image processing unit to create image data for output including toner image data on four colors of yellow, cyan, magenta, and black such that toner images have line-shaped periodic structures; and an image forming unit to form the toner images using coloring materials of the four colors and superposing the toner images on a recording medium, wherein the line-shaped periodic structures of the toner images of the four colors are determined based on a combination of periodic structures having screen ruling and screen angles specified in table 1 below:

TABLE 1

| No. | ruling | angles | a0x | a0y | a1x | a1y |
|---|---|---|---|---|---|---|
| 0 | 180.3 | 33.7 | 3 | 2 | 3 | −2 |
| 1 | 180.3 | 146.3 | −3 | 2 | 3 | 2 |
| 2 | 200.0 | 0.0 | 3 | 0 | 0 | −3 |
| 3 | 200.0 | 90.0 | 0 | 3 | 3 | 0 | where four values of a0x, a0y, a1x, and a1y correspond to x component, y component of a main vector and x component, y component of a sub-vector, respectively, and the four colors are designated to No. 0 to No. 3.

BRIEF DESCRIPTION OF THE DRAWINGS

FIG. 1A is a diagram showing periodic structures of dithering in example 1;

FIG. 1B is a diagram showing other periodic structures of dithering in example 1;

FIG. 8A is a diagram showing periodic structures of dithering in example 2;

DETAILED DESCRIPTION OF THE PREFERRED EMBODIMENTS

Figure 2:
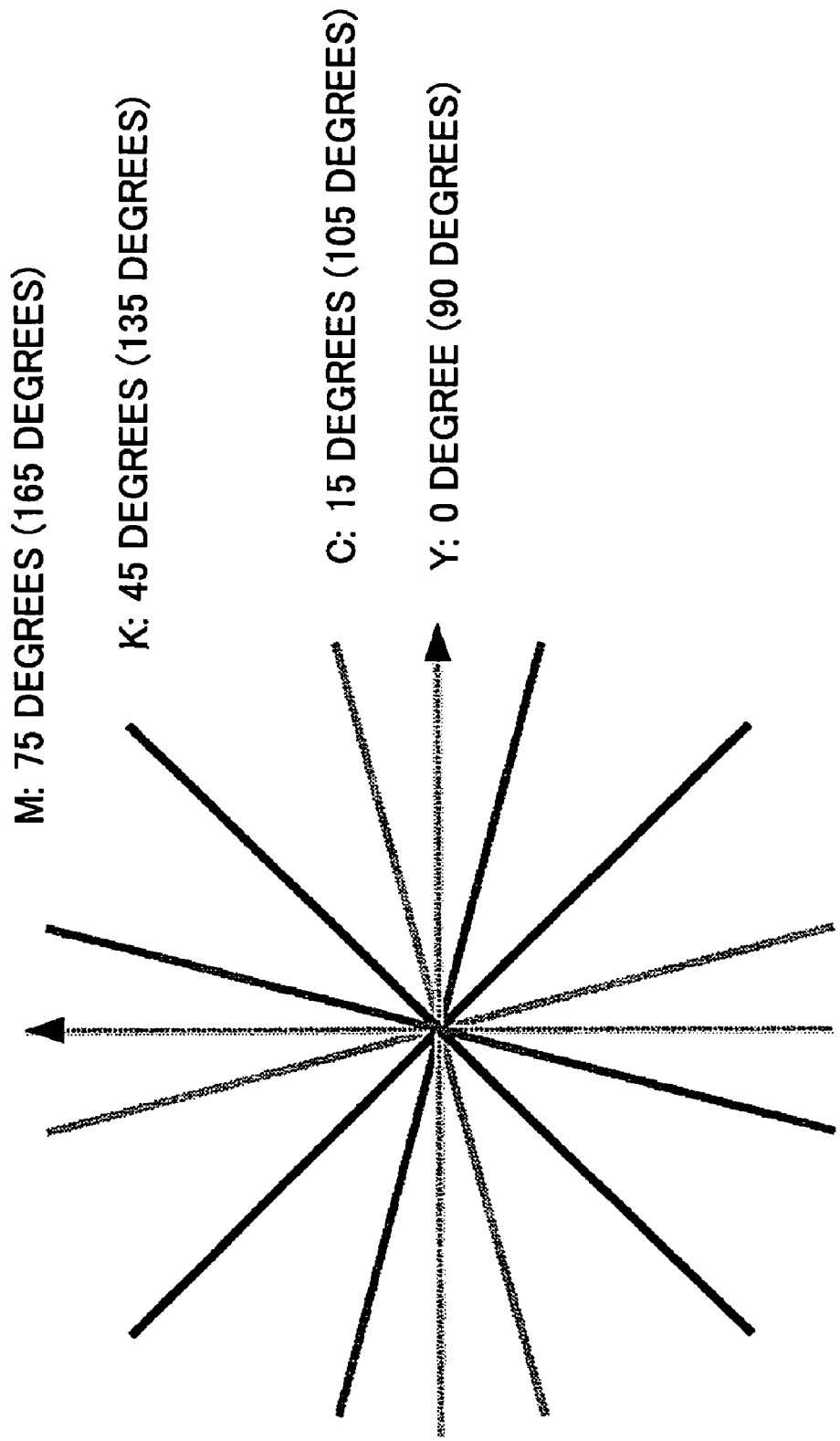
FIG. 2 is a diagram showing setting of screen angles of CMYK colors in a conventional printing method.
Figure 3:
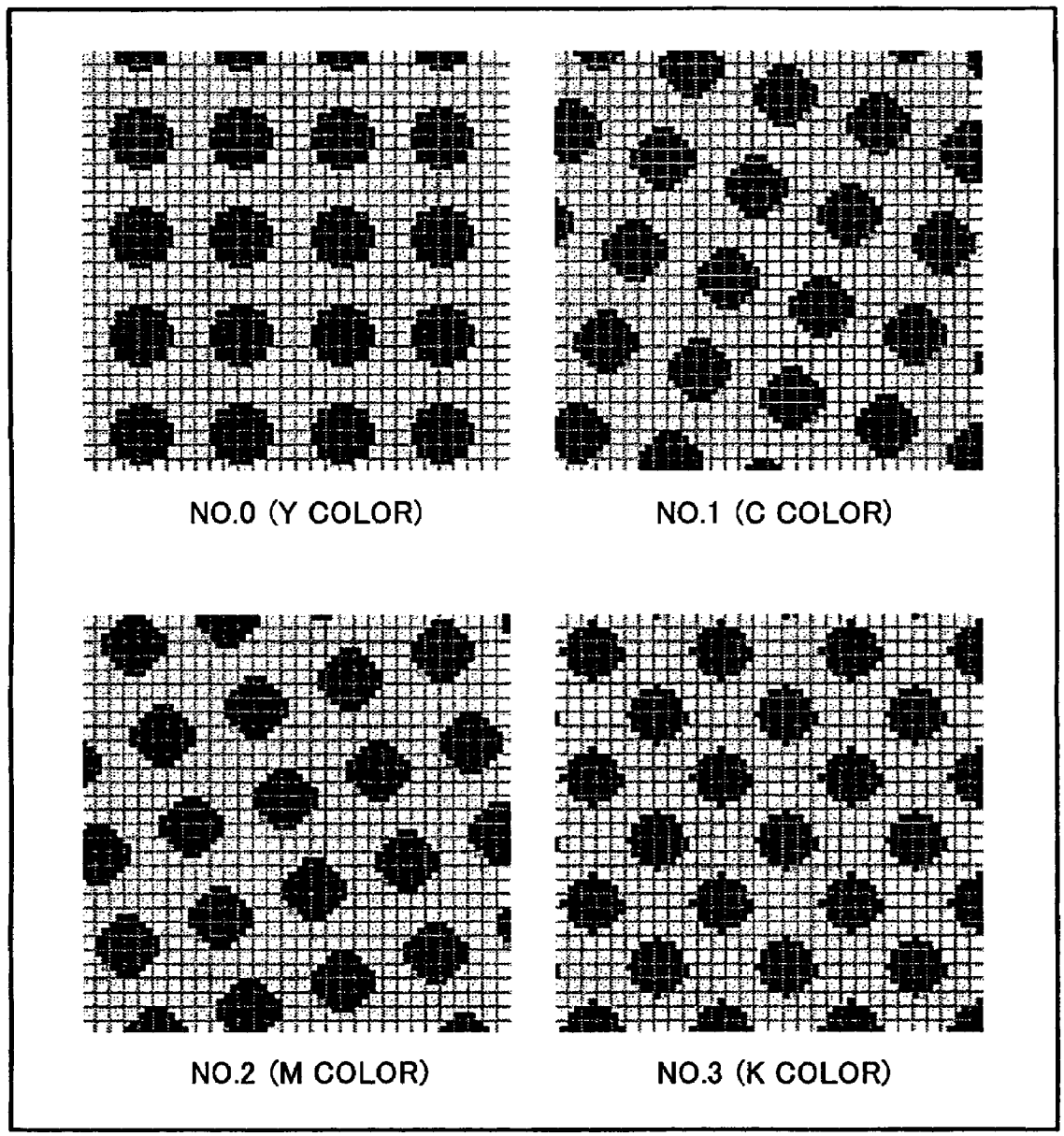
FIG. 3 is a diagram showing periodic structures of a dot screen type in a conventional printing method.

Embodiments of the present invention include an improved and useful image forming apparatus and an image forming method in which the above-mentioned problems are eliminated.

More specific embodiments of the present invention include an image forming apparatus and an image forming method that can output an image preferable in terms of color moiré by using line screen dithering for all the four CMYK colors and combining dither matrices different from conventional dither matrices.

In many cases, commercialized ink-jet printers express images based on an error diffusion method without using the above-mentioned dither method as a pseudo-halftone processing method. The error diffusion method is a pseudo-halftone processing method based on frequency modulation and has no periodic component, so that color moiré resulting from plural superposed colors is not generated in principle. In other words, general ink-jet printers currently available on the market are free from color moiré.

Electrophotographic image forming apparatuses are capable of avoiding the color moiré problem by using a pseudo-halftone processing method without periodicity as in the error diffusion method in the same manner as in ink-jet printers. However, the electrophotographic method has insufficient reproducibility or stability for an isolated single dot, so that adaptability thereof to the error diffusion method is not enough. When the error diffusion method is used in a printer engine having insufficient reproducibility or stability for an isolated single dot, graininess is reduced and striped unevenness is recognized. As a result, image quality is rather deteriorated. The pseudo-halftone processing method based on dithering is the most suitable method for electrophotography with insufficient stability for dots, so that it is important to realize an image processing method based on dithering without generating color moiré.

Other embodiments of the present invention include an image forming apparatus and an image forming method preferable in terms of color moiré when a dither method is used in an electrophotographic image forming apparatus.

Experiments of image output conducted by the inventors show that, in an image forming apparatus with a period of six pixels (six lines) for the change of a writing position in the sub-scanning direction, the periodic structure of dithering interferes with the change of a writing position and the interference is recognized as a density change in low frequencies (hereafter this density change is referred to as "surface tilt moiré" in order to distinguish from "color moiré"). This surface tilt moiré brings discomfort to the user in cases of photographic images or graphics images where uniformity of images is required and may become a factor in degradation of image quality.

When conventional dither sets empirically determined as preferable are used, the generation of the above-mentioned surface tilt moiré is substantially noticeable when the above-mentioned change of a writing position is generated with a period of six pixels in the sub-scanning direction. Thus, a dither set that does not generate such a surface tilt moiré is required.

One method for eliminating the surface tilt moiré may be to reduce the change of a writing position. However, in order to reduce the change of a writing position, it is necessary to further improve element accuracy, driving accuracy, and the like. In other words, (1) a standard for the polygon mirror must be strict, (2) nonuniformity of a photoconductor drum and unevenness of rotation thereof must be reduced in order to realize driving at a constant speed, and (3) vibration of an optical scanning apparatus (optical unit) must be reduced. As a result, a price of an entire image forming apparatus is increased.

Another embodiment of the present invention is to realize a low-price image forming apparatus by using dither sets that do not generate a surface tilt moiré (density unevenness in low frequencies) resulting from the change of a writing position in the sub-scanning direction. In addition, the dither sets used in embodiments of the present invention are a combination of dither matrices preferable in terms of color moiré generated from interference of the dither matrices.

When a line screen type dither matrix (so called lateral lines in the main scanning direction) having a screen angle of 0 degree is used, if the dither matrix is assigned to a highly concentrated toner color, what is called banding is noticeable. Such a defect referred to as banding results from unevenness of density in the sub-scanning direction. Causes of the banding are considered to include unevenness of a driving speed of the photoconductor drum, vibration of a writing device, and the like. Although the uneven density in the sub-scanning direction is the same phenomenon as the unevenness of the scanning pitch resulting from the above-mentioned surface tilt, the banding refers to a long period of density change, namely, 0.5 to 10 mm (the unevenness of scanning pitch resulting from the surface tilt refers to a period of about 0.2 to 0.4 mm). The banding is caused in special frequencies directly recognized in this manner, so that the generation of the banding becomes a factor in substantial degradation of image quality.

Other embodiments of the present invention include an image forming apparatus and a method by which banding is not generated.

According to one embodiment of the present invention there is provided an image forming apparatus for recording images, comprising: an image processing units to create image data for output including toner image data on four colors of yellow (Y), cyan (C), magenta (M), and black (K) such that toner images have line-shaped periodic structures; and an image forming unit to form the toner images using toners of the four colors and superposing the toner images on a recording medium, wherein the line-shaped periodic structures of the toner images of the four colors are determined based on a combination of periodic structures having screen ruling and screen angles specified in table 1 described later.

The number of combinations of dither matrices having line-shaped periodic structures is substantially large (tens of thousands to several billions), so that it is practically impossible to combine the dither matrices at random and find out combinations of CMYK colors preferable in terms of color moiré. In accordance with this, combinations of dither matrices (dither sets) of CMYK colors empirically known as preferable in terms of color moiré have been used. The inventors of the present invention have discovered through experiments that a combination of four dither periodic structures shown in table 1 described later is capable of preventing color moiré. The present invention relates to novel techniques in which the four dither periodic structures shown in table 1 are applied to periodic structures of toner images of CMYK colors used in an image forming apparatus. Further, image output experiments are conducted and output images are evaluated in detail and constitution contributing to decreased color moiré is examined.

According to one aspect (table 1) of the present invention, an image forming apparatus is provided with a dither set based on such examination results, so that it is possible to realize a color image forming apparatus preferable in terms of color moiré in all colors (including secondary colors and tertiary colors) formed by combining toner images of CMYK colors.

According to another aspect (table 2) of the present invention, the inventors of the present invention have discovered through experiments that a combination of dither matrices differing from table 1 is capable of preventing color moiré. The combination shown in table 2 described later is a novel combination first proposed in the present invention. The present invention according to another aspect (table 2) relates to an image forming apparatus provided with a dither set based on such examination results, so that it is possible to realize a color image forming apparatus preferable in terms of color moiré in all colors (including secondary colors and tertiary colors) formed by combining toner images of CMYK colors.

According to another embodiment of the present invention, the present invention contributes to prevention of color moiré in an electrophotographic image forming apparatus. In the electrophotographic image forming apparatus, reproducibility and stability of an isolated single dot are not sufficient, so that preferable image quality is more likely to be maintained when a dither method having periodic toner image structures is used as a pseudo-halftone processing method. Thus, according to another embodiment of the present invention, it is possible to maintain preferable image quality having preferable graininess without noticeable striped unevenness in the electrophotographic image forming apparatus. Accordingly, it is possible to realize a color image forming apparatus preferable in terms of color moiré.

According to one embodiment of the present invention, it is confirmed through image output experiments that the unevenness in density (density unevenness in low frequencies that can be visible to human eyes) resulting from the interference of a change of a writing position in the sub-scanning direction and the periodic structure of dithering is not generated when a resolution in the sub-scanning direction is 600 dpi or even when the change of the writing position in the sub-scanning direction is generated with a period of six pixels (lines). Conventionally, the change of the writing position in the sub-scanning direction generated with a period of six pixels interferes with the periodic structure of dithering and this interference is recognized by the user as a density change in low frequencies. Such a density change in low frequencies brings discomfort to the user and degrades image quality. In particular, in cases of photographic images or graphics images where uniformity of images is required for output images, this may become a factor in substantial degradation of image quality. According to one embodiment of the present invention, it is possible to realize an image forming apparatus preferable in terms of color moiré and the density change in low frequencies along with the change of the writing position is not generated. Thus, it is possible to output high-quality images. In particular, it is possible to output high-quality images superior in uniformity in photographic images or graphics images.

An embodiment of the present invention employs a structure for forming an electrostatic latent image on a photoconductor by allowing a laser light to reflect on a polygon mirror. It is confirmed through image output experiments that the unevenness in density (density unevenness in low frequencies that can be visible to human eyes) conventionally generated along with surface tilt of a polygon mirror is eliminated when a resolution of optical writing in the sub-scanning direction is 600 dpi and the number (N) of laser light sources and the number (M) of reflection surfaces of the polygon mirror satisfy an equality: N×M=6. Conventionally, a method for reducing surface tilt is employed as a method for preventing the density change in low frequencies generated from the interference of the change of a writing position in the sub-scanning direction along with surface tilt and the periodic structure of dithering. However, this method requires a strict surface tilt standard for the polygon mirror and thus leads to an increase of an element cost and an image forming apparatus cost. An embodiment of the present invention is configured to have no density change in low frequencies resulting from surface tilt, so that the surface tilt standard for the polygon mirror may be relaxed and a low-cost image forming apparatus can be realized. According to one embodiment of the present invention, it is possible to realize a color image forming apparatus preferable in terms of color moiré, and the surface tilt standard does not need to be strict. Thus, it is possible to output high-quality images without the generation of density change in low frequencies along with the change of the writing position while realizing a low-cost image forming apparatus. In particular, it is possible to output high-quality images superior in uniformity in photographic images or graphics images.

An embodiment of the present invention uses a dither matrix having a screen angle of 0 degree (so called lateral lines) and assigns the dither matrix to Y color, so that it is possible to prevent abnormal images that may become a factor in degradation of image quality referred to as banding and to output high-quality images.

Other embodiments, features and advantage of the present invention will become more apparent from the following detailed description when read in conjunction with the accompanying drawings.

In the following, embodiments of the present invention will be described with reference to the accompanying drawings.

Example 1

Figure 4:
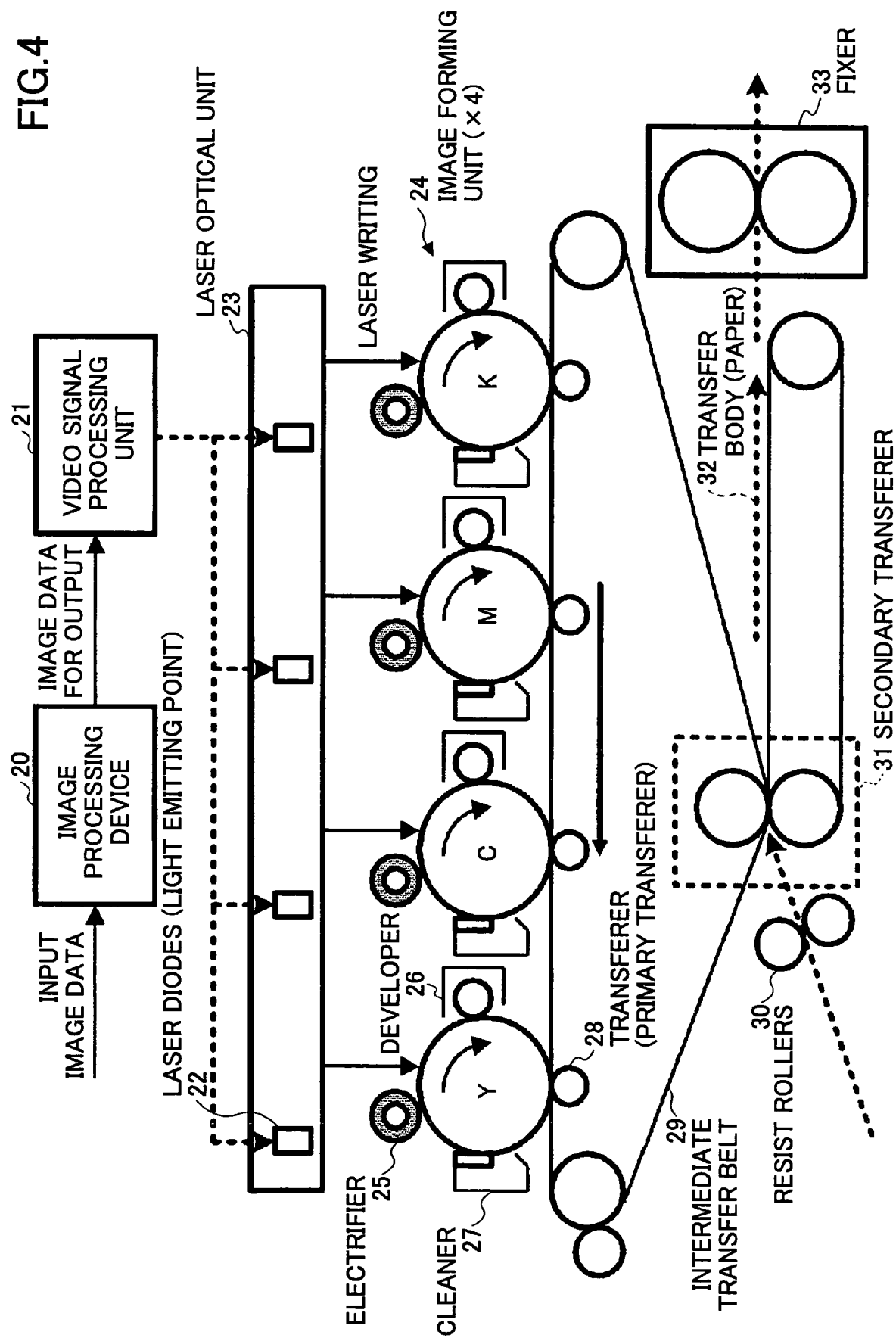
FIG. 4 is a diagram showing a full-color imaging device in example 1.

FIG. 4 is a diagram showing a structure of a full-color imaging device in a full-color image forming apparatus in example 1. The full-color imaging device in example 1 is for forming an image by superposing, on a recording sheet, color component images of four colors, namely, yellow (Y), cyan (C), magenta (M), and black (K). In example 1, four image forming units 24 corresponding to each of the CMYK color components are arranged as shown in FIG. 4. Toner images of the color components formed in each of the image forming units 24 are successively transferred to a belt-like intermediate transfer body (intermediate transfer belt) 29 disposed in abutment with the four image forming units. The intermediate transfer body 29 is rotated at a predetermined timing by a driving unit not shown in the drawings, so that the toner images corresponding to each color component are superposed on the intermediate transfer body 29 at a predetermined position. The toner images of the color components superposed on the intermediate transfer body 29 are collectively transferred on a recording sheet (transfer body, namely, paper) 32 and become an image on the recording sheet 32.

In example 1, the aforementioned image forming units 24 corresponding to each of the four CMYK colors have the same structure; therefore, only one of the units is described. The image forming unit 24 includes a photoconductor drum, an electrifier 25 for electrifying the photoconductor drum to a desired electric potential, a laser optical unit 23 writing image data for output (image data subjected to pseudo-halftone processing described later) on the photoconductor drum electrified to the desired electric potential, a developer 26 for developing an electrostatic latent image on the photoconductor drum using a toner corresponding to each color component, the electrostatic latent image being formed through the writing by the laser optical unit 23, a transferer (primary transferer) 28 for transferring a toner image developed on the photoconductor by the developer 26 to the intermediate transfer body 29, and a cleaner 27 for cleaning residual toner left on the photoconductor without being transferred to the intermediate transfer body.

The recording sheet 32 such as paper is carried by a carrying unit from a recording sheet bank not shown in the drawings, and then carried to a secondary transferer 31 after a predetermined timing is adjusted at resist rollers 30. The secondary transferer 31 transfers toner images (toner images in four colors) on the aforementioned intermediate transfer body to a desired position on the recording sheet 32. The recording sheet 32 to which the toner image are transferred is provided with heat and pressure at a fixer 33 and then ejected from an apparatus. In accordance with the above-mentioned operational procedure, a full-color image corresponding to image data is formed on a recording sheet such as paper.

Next, with reference to FIG. 4, the following describes an operation of the laser optical unit 23 operating base on image data for output formed by an image processing device 20 described below. A video signal processing unit 21 receives the image data for output (image processing results) formed by the image processing device 20 described below, stores data on light sources 22 (semiconductor lasers and laser diodes) in a line memory, and transmits the data, stored in the line memory and corresponding to each pixel, to a PWM controller at a predetermined timing (pixel clock) (in example 1, the number of light sources is one for each color) in accordance with signals synchronized with a rotation of a polygon mirror (namely, synchronizing signals).

The PWM controller converts the data into pulse width modulated (PWM) signals and transmits the pulse width modulated signals to an LD driver. The LD driver drives an LD element (semiconductor laser) based on optical modulation using a predetermined amount of light in accordance with the pulse width modulated signals. In example 1, pulse width modulation (PWM) control is performed in accordance with the image data for output for each color component and the laser is driven based on optical modulation.

Figure 5:
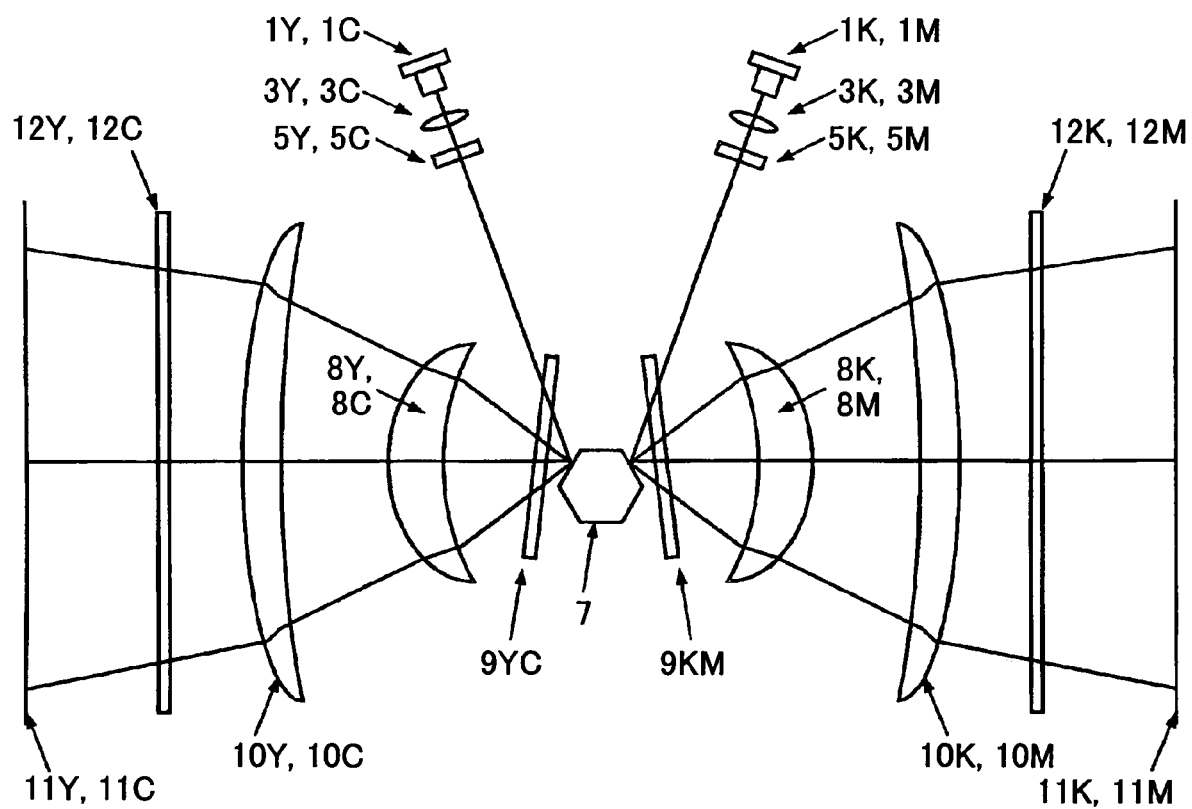
FIG. 5 is a diagram showing an optical device (laser optical unit) in example 1.

Next, the following describes a structure of an optical unit (optical device) forming an electrostatic latent image by scanning the photoconductor using a laser beam driven based on optical modulation. FIG. 5 is a schematic diagram showing an optical device in example 1. Reference numerals 1Y, 1C, 1M, and 1K designate semiconductor lasers of light sources. In the following, Y, C, M, and K indicated after reference numerals designate members relating to yellow, magenta, cyan, and black, successively. The semiconductor laser 1Y indicates yellow for image forming, and the semiconductor lasers 1C, 1M, and 1K indicate cyan, magenta, and black for image forming, respectively. Further, reference numerals 3Y, 3C, 3M, and 3K designate collimate lenses, reference numerals 5Y, 5C, 5M, and 5K designate cylindrical lenses, reference numeral 7 designates a polygon mirror, and reference numerals 8Y, 8C, 8M, 8K, 10Y, 10C, 10M, and 10K designate lenses (f-θ lenses) as imaging elements constituting a scanning imaging optical system. In the four semiconductor lasers 1Y to 1K, four collimate lenses 3Y to 3K, four cylindrical lenses 5Y to 5K, and four f-θ lenses 8Y to 8K, the same elements are used for each group and other four f-θ lenses 10Y to 10K are also the same element. Reference numeral 9YC and 9KM designate sound-proof glass for a sound cancellation effect on the polygon mirror. Reference numerals 12Y, 12C, 12M, and 12K designate dust-proof glass for a dust-proof effect on the optical system. The semiconductor laser 1Y, collimate lens 3Y, cylindrical lens 5Y, polygon mirror 7, f-θ lenses 8Y and 10Y constitute a "scanning optical system for a yellow image" for forming an electrostatic latent image for a yellow image on a scanned surface 11Y. In the same manner, the semiconductor laser 1C, collimate lens 3C, cylindrical lens 5C, polygon mirror 7, f-θ lenses 8C and 10C constitute a "scanning optical system for a cyan image" for forming an electrostatic latent image for a cyan image on a scanned surface 11C. Further, the semiconductor laser 1M, collimate lens 3M, cylindrical lens 5M, polygon mirror 7, f-θ lenses 8M and 10M constitute a "scanning optical system for a magenta image" for forming an electrostatic latent image for a magenta image on a scanned surface 11M. Moreover, the semiconductor laser 1K, collimate lens 3K, cylindrical lens 5K, polygon mirror 7, f-θ lenses 8K and 10K constitute a "scanning optical system for a black image" for forming an electrostatic latent image for a black image on a scanned surface 11K. These scanning optical system for a yellow image, scanning optical system for a cyan image, scanning optical system for a magenta image, and scanning optical system for a black image are optically the same element.

The semiconductor laser 1C, collimate lens 3C, and cylindrical lens 5C are disposed such that the semiconductor laser 1Y, collimate lens 3Y, and cylindrical lens 5Y are disposed on the same positions in a direction orthogonal to the figure (sub-scanning direction). In the same manner, the semiconductor laser 1M, collimate lens 3M, and cylindrical lens 5M are disposed such that the semiconductor laser 1K, collimate lens 3K, and cylindrical lens 5K are disposed on the same positions in the direction orthogonal to the figure (sub-scanning direction). Further, paths from the polygon mirror 7 to the scanned surfaces 11Y, 11M, 11C, and 11K are shown as "linearly expanded optical paths". A multifaceted mirror as a moving portion of the polygon mirror is rotated at a constant speed around an axis orthogonal to the figure.

In the following, an outline of optical scanning is described based on the "scanning optical system for a yellow image" as an example. The semiconductor laser 1Y is driven in accordance with image data for output corresponding to a yellow image and an optically modulated laser beam is emitted. The laser beam is converted through the collimate lens 3Y into a beam form suitable for an optical system used thereafter. Although the beam form converted through the collimate lens 3Y is a parallel beam or a beam having weak divergence or weak convergence, the beam form is referred to as a "parallel beam" in the present specification.

The beam made to be the parallel beam is condensed in the sub-scanning direction by the cylindrical lens 5Y and imaged in the vicinity of a deflection surface of the polygon mirror 7 as an "image elongated in the main scanning direction". The image becomes a deflection beam deflected in terms of constant angular velocity in accordance with a rotation of the polygon mirror at a constant speed and enters the f-θ lens 8Y. Then, the image is condensed on the scanned surface 11Y as an optical spot due to an imaging effect through the f-θ lenses 8Y and 10Y and the optical spot scans the scanned surface 11Y. Optical scanning performed by the scanning optical systems for cyan, magenta, and black colors is exactly the same.

Figure 6:
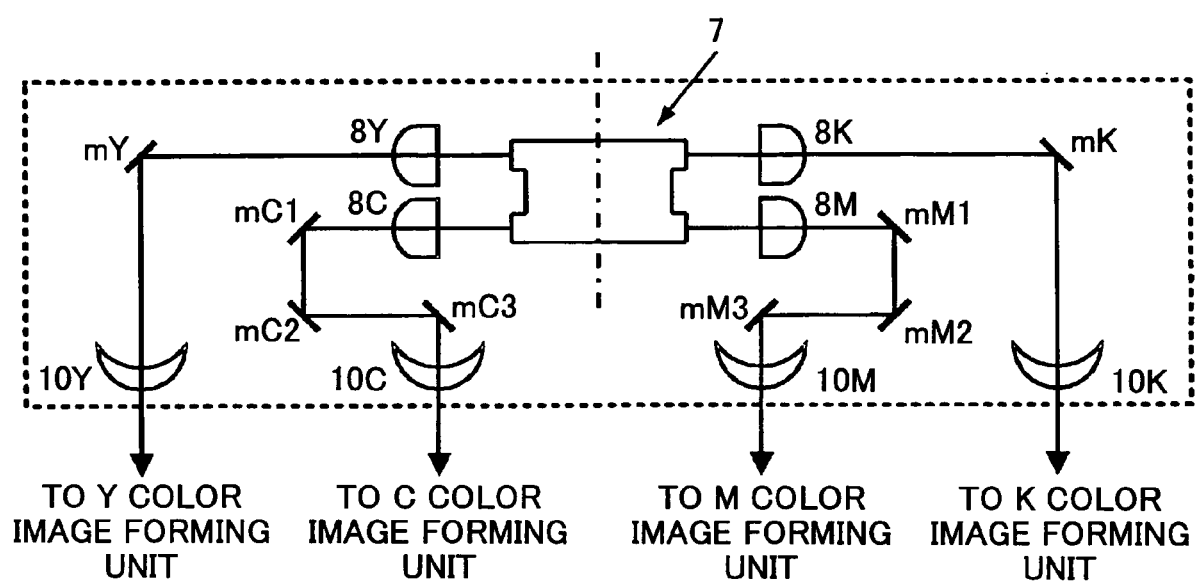
FIG. 6 is a diagram showing optical paths of an optical device (laser optical unit) in example 1.

FIG. 6 is a diagram showing optical paths of each color from the polygon mirror 7. A portion surrounded with broken lines indicates the optical scanning apparatus of FIG. 5. The beam for forming a yellow image deflected by the polygon mirror 7 passes through the f-θ lens 8Y, reflects on a mirror mY for turning an optical path, passes through the f-θ lens 10Y, and forms an optical spot on the photoconductor which is a scanned surface. A beam for forming a cyan image deflected by the polygon mirror 7 passes through the f-θ lens 8C, successively reflects on mirrors mC1 to mC3 for turning an optical path, passes through the f-θ lens 10C, and forms an optical spot on the photoconductor which is a scanned surface. A beam for forming a magenta image deflected by the polygon mirror 7 passes through the f-θ lens 8M, successively reflects on mirrors mM1 to mM3 for turning an optical path, passes through the f-θ lens 10M, and forms an optical spot on the photoconductor which is a scanned surface. A beam for forming a black image deflected by the polygon mirror 7 passes through the f-θ lens 8K, reflects on a mirror mK for turning an optical path, passes through the f-θ lens 10K, and forms an optical spot on the photoconductor which is a scanned surface.

In example 1, the number (N) of light sources used for the CMYK colors is one for each color and the number (M) of reflection surfaces of the polygon mirror (the polygon mirror is shared for the CMYK colors) is six.

In the image processing device 20 (FIG. 4), a procedure for image processing performed when creating the above-mentioned image data for output from input image data is as follows. Example 1 relates to what is called a laser printer type, so that the input image data is assumed be a multivalued (eight bits) image from a personal computer, for example (in a case of a digital copying machine, a scanner for reading text is added and input data is transmitted from the scanner unit).

The input image data is subjected to emphasis processing in an MTF filter processing unit in the image processing device, and then resultant image data is subjected to color conversion from an RGB color space to a CMYK color space and density control for realizing a predetermined gradation in a color separation/gradation correction processing unit (γ conversion). Thereafter, the image data is subjected to dither processing (details thereof are described later) as pseudo-halftone processing in order to comply with printer characteristics in a pseudo-halftone processing unit and resultant image data is transmitted to an image output side (laser light modulation driving side) as image data for output. MTF filter processing, color correction processing, and γ correction processing are the same as in conventional techniques and details thereof are omitted.

Next, the following describes multivalued dither processing as pseudo-halftone processing in example 1. In example 1, 4 bit dithering is performed in which data after the pseudo-halftone processing is 4 bits (hexadecimal). In the 4 bit dithering, each pixel of 8 bit data (each pixel is expressed in 256 gradations from 0 to 255) as input data is converted into image data for output expressed in 16 gradations from level 0 to level 15. In this conversion, a gradation value (256 gradations) of each pixel of the input data is compared with a threshold value set in the above-mentioned 16 gradation levels in advance and stored (in a memory or a hard disk of the image processing device) in order to determine which level ranging from level 0 to level 15 each pixel of the input data belongs to. In other words, 4 bit dither matrices are formed with 15 matrices in which threshold values are set (regarding a calculation method for image data for output in the dither method, refer to Japanese Laid-Open Patent Application No. 2000-299783, for example). In example 1, although the number of quantization in the dither processing is 4 bits (hexadecimal), other number may be employed. For example, in addition to 1 bit, 2 bits, and 8 bits, ternary or quinary may be employed. The same effect is obtained based on any number of quantization as long as a toner image with the following periodic structure is formed from dither matrices.

In example 1, the periodic structure of the dither matrices has a line-shaped structure and the dither matrices are referred to as line screen dithering. Screen angles and screen ruling are used as numerical values characteristic of the periodic structure of the dither matrices.

Figure 7:
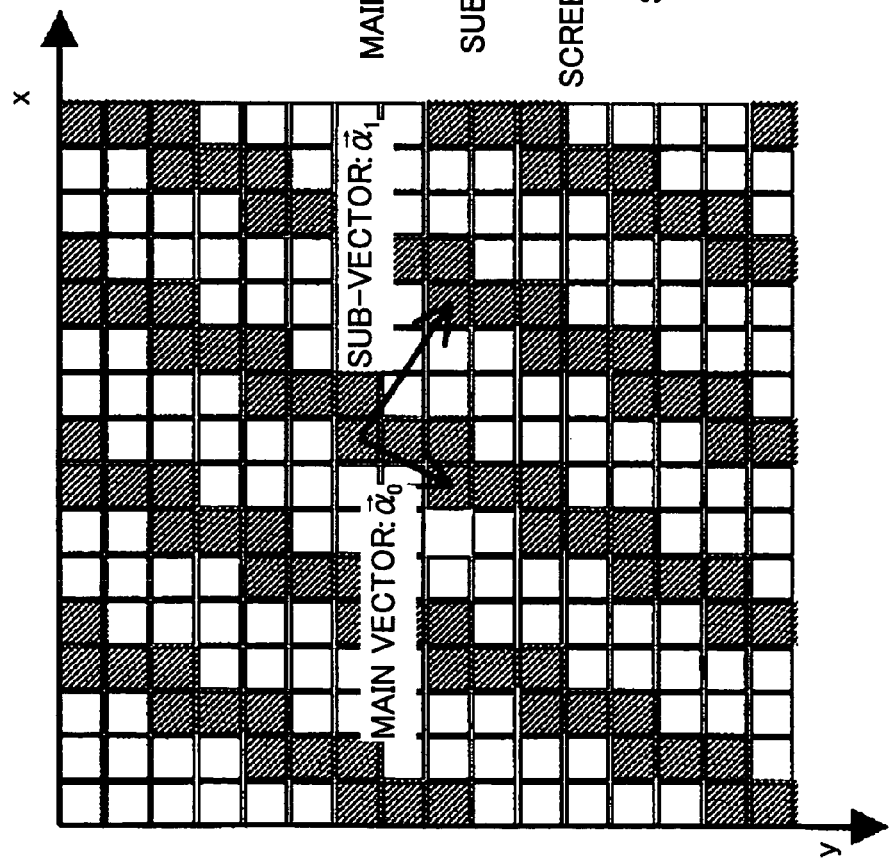
FIG. 7 is a diagram showing a relationship among a periodic structure of dithering, main/sub-vectors, and screen angle/ruling.

In a case of dither matrices with a periodic structure shown in FIG. 7, screen angles and screen ruling are uniquely calculated in accordance with calculation formulas in FIG. 7. In general, a two-dimensional periodic structure is represented by two two-dimensional vectors. The two vectors are hereafter referred to as a main vector and a sub-vector.

Table 1 below shows a combination of the four dither matrices in example 1 when the above-mentioned main vector and sub-vector are used.

TABLE 1

| No. | ruling | angles | a0x | a0y | a1x | a1y |
|-----|--------|--------|-----|-----|-----|-----|
| Y | 200.0 | 0.0 | 3 | 0 | 0 | −3 |
| C | 180.3 | 146.3 | −3 | 2 | 3 | 2 |
| M | 180.3 | 33.7 | 3 | 2 | 3 | −2 |
| K | 200.0 | 90.0 | 0 | 3 | 3 | 0 |

Dither Set of Example 1 (Screen Ruling and Screen Angles of Dithering for YCMK Colors)

FIGS. 1A and 1B show the periodic structures of dither matrices represented by the main vector and sub-vector in table 1. FIG. 1A shows a dither pattern when an image area percentage is 30%. FIG. 1B shows a dither pattern when the image area percentage is 50%. In example 1, the input data is subjected to dither processing such that the image data for output in each of the CMYK colors has a periodic structure shown in table 1. And an electrostatic latent image is formed on the photoconductor via the above-mentioned laser optical unit (optical device). Thereafter, a desired full-color image is formed on paper by the above-mentioned full-color imaging device. In table 1, when M color is designated to No. 0, C color is designated to No. 1, Y color is designated to No. 2, and K color is designated to No. 3, the following table 1-1 is obtained.

TABLE 1-1

| No. | ruling | angles | a0x | a0y | a1x | a1y |
|-----|--------|--------|-----|-----|-----|-----|
| 0 | 180.3 | 33.7 | 3 | 2 | 3 | −2 |
| 1 | 180.3 | 146.3 | −3 | 2 | 3 | 2 |
| 2 | 200.0 | 0.0 | 3 | 0 | 0 | −3 |
| 3 | 200.0 | 90.0 | 0 | 3 | 3 | 0 |

Example 2

A structure of example 2 is largely the same as in example 1. The same full-color imaging device, laser optical unit, optical unit (optical device) as in example 1 are used. Although an image processing device is largely the same as in example 1, dither matrices to be employed in dither processing as pseudo-halftone processing are different from example 1, so that a periodic structure of image data for output subjected to the dither processing is different from example 1.

In the following the dither processing in example 2 is described. Table 2 below shows a combination of dither matrices for the CMYK colors in example 2 when the main vector and sub-vector are used in the same manner as in example 1.

TABLE 2

| No. | ruling | angles | a0x | a0y | a1x | a1y |
|---|---|---|---|---|---|---|
| Y | 200.0 | 0.0 | 3 | 0 | 0 | −3 |
| C | 180.3 | 146.3 | −3 | 2 | 3 | 2 |
| M | 180.3 | 33.7 | 3 | 2 | 3 | −2 |
| K | 189.7 | 108.4 | −1 | 3 | 3 | 1 |

Dither Set of Example 2 (Screen Ruling and Screen Angles of Dithering for YCMK Colors)

Figure 8B:
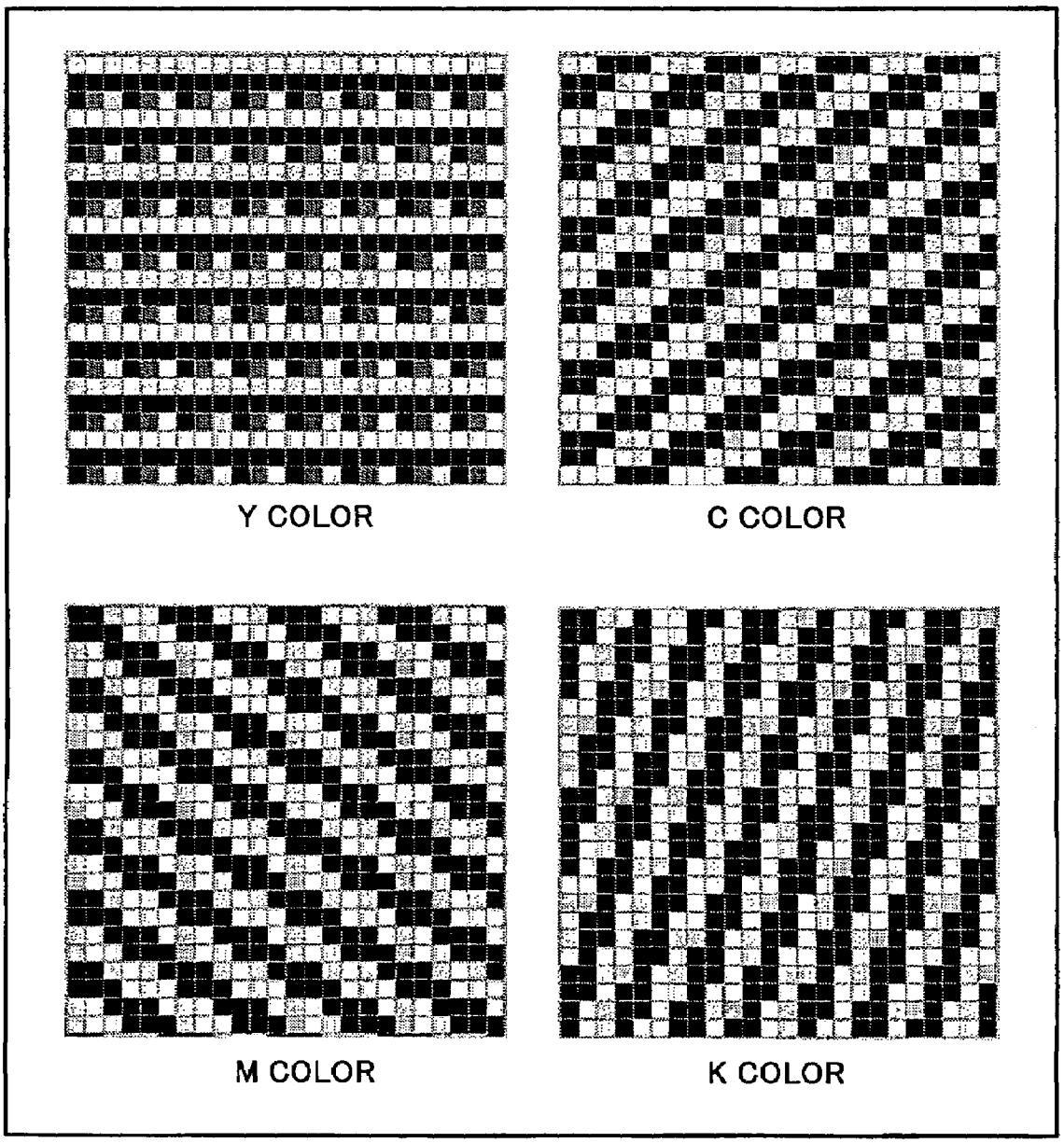
FIG. 8B is a diagram showing other periodic structures of dithering in example 2.

FIGS. 8A and 8B are diagrams showing the periodic structures of dither matrices represented by the main vector and sub-vector in table 2. FIG. 8A shows a dither pattern when the image area percentage is 30%. FIG. 8B shows a dither pattern when the image area percentage is 50%. In example 2, the input image data is subjected to dither processing such that the image data for output in each of the CMYK colors has a periodic structure shown in table 2. And an electrostatic latent image is formed on the photoconductor via the laser optical unit, optical unit (optical device) in the same manner as in example 1. Thereafter, a desired full-color image is formed on paper by the same full-color imaging device as in example 1. In table 2, when M color is designated to No. 0, C color is designated to No. 1, K color is designated to No. 2, and Y color is designated to No. 3, the following table 2-1 is obtained.

TABLE 2-1

| No. | ruling | angles | a0x | a0y | a1x | a1y |
|---|---|---|---|---|---|---|
| 0 | 180.3 | 33.7 | 3 | 2 | 3 | −2 |
| 1 | 180.3 | 146.3 | −3 | 2 | 3 | 2 |
| 2 | 189.7 | 108.4 | −1 | 3 | 3 | 1 |
| 3 | 200.0 | 0.0 | 0 | 0 | 0 | −3 |

(Comparative Experiment 1)

Next, comparative experiment 1 conducted by the inventors is described. In this experiment, sets of dither matrices with the aforementioned periodic structures of table 1 (example 1) and table 2 (example 2) were created and dither processing was performed. Images were actually output from an experimental device, and generation of color moiré was evaluated based on visual observation.

The evaluation of the generation of color moiré based on visual observation was conducted as follows. Five levels (1: bad to 5: good) of boundary samples were created in advance, 140 patches were selected from an entire color reproduction area, and images created for evaluation were output. All the 140 patches were ranked from 1 to 5 as described in the following, and average values were calculated for evaluation. The above-mentioned levels of the boundary samples were represented in qualitative wording as follows.

Rank 5: color moiré is not recognized

Rank 4: slight color moiré is recognized by careful observation

Rank 3: certain degree of moiré is recognized

Rank 2: color moiré is noticeable

Rank 1: obviously abnormal color moiré is recognized

Further, an image output experiment was conducted with the use of an experimental device (converted based on Ricoh IPSiO Color 5100) capable of outputting images while altering pseudo-halftone processing. Specifications of the experimental device are as follows.

Writing resolution: 600 dpi

Number of light sources (number of semiconductor lasers): one for each of CMYK colors Wavelength of semiconductor laser: 655 nm Number of reflection surfaces of the polygon mirror: 6

Processing speed (circumferential speed of the photoconductor drum): 125 mm/sec

Number of rotation of the polygon mirror: about 29500 rpm

Periodic structures of dither sets (combinations of dither matrices for the CMYK colors) on which the image output experiment was conducted as a comparative experiment were those shown in tables 1 and 2 described in examples 1 and 2 and those shown in tables 3 to 5 below as comparative examples. Dither matrices used in comparative examples 1 to 3 were based on 4 bit dithering in which data after the pseudo-halftone processing was 4 bits (hexadecimal) in the same manner as in examples 1 and 2.

TABLE 3

| No. | ruling | angles | a0x | a0y | a1x | a1y |
|---|---|---|---|---|---|---|
| Y | 189.7 | 161.6 | −3 | 1 | 1 | 3 |
| C | 212.1 | 135.0 | −2 | 2 | 2 | 2 |
| M | 189.7 | 108.4 | −1 | 3 | 3 | 1 |
| K | 200.0 | 90.0 | 0 | 3 | 3 | 0 |

Dither Set of Comparative Example 1 (Screen Ruling and Screen Angles of Dithering for YCMK Colors)

TABLE 4

| No. | ruling | angles | a0x | a0y | a1x | a1y |
|---|---|---|---|---|---|---|
| Y | 189.7 | 161.6 | −3 | 1 | 1 | 3 |
| C | 189.7 | 108.4 | −1 | 3 | 3 | 1 |
| M | 212.1 | 135.0 | −2 | 2 | 2 | 2 |
| K | 200.0 | 90.0 | 0 | 3 | 3 | 0 |

Dither Set of Comparative Example 2 (Screen Ruling and Screen Angles of Dithering for YCMK Colors)

TABLE 5

| No. | ruling | angles | a0x | a0y | a1x | a1y |
|---|---|---|---|---|---|---|
| Y | 189.7 | 161.6 | −3 | 1 | 1 | 3 |
| C | 180.3 | 146.3 | −3 | 2 | 3 | 2 |
| M | 180.3 | 56.3 | 2 | 3 | 2 | −3 |
| K | 189.7 | 108.4 | −1 | 3 | 3 | 1 |

Dither Set of Comparative Example 3 (Screen Ruling and Screen Angles of Dithering for YCMK Colors)

Table 6 shows an evaluation result of the generation of color moiré based on visual observation.

TABLE 6

| Example number | Color moiré visual observation result | Comments |
|---|---|---|
| Example 1 (table 1) | 4.52 | Very good with no color moiré |
| Example 2 (table 2) | 4.51 | Very good with no color moiré |
| Comparative example 1 (table | 3.34 | Color moiré is noticeable between M-K colors |

TABLE 6-continued

| Example number | Color moiré visual observation result | Comments |
|---|---|---|
| 3) | | |
| Comparative example 2 (table 4) | 3.54 | Color moiré is noticeable between C-K colors |
| Comparative example 3 (table 5) | 3.78 | Color moiré is noticeable between Y-C colors |

Evaluation Result of Color Moiré Based on Visual Observation in Examples 1 and 2 and Comparative Examples 1 to 3.

As understood from the result of evaluation based on visual observation in table 6, in accordance with the dither combinations shown in table 1 (example 1) and table 2 (example 2), it is possible to obtain good output images with no generation of color moiré. By contract, in accordance with the dither combinations shown in table 3 (comparative example 3), table 4 (comparative example 4), and table 5 (comparative example 5), color moiré is recognized, so that only those low-quality output images are obtained.

In this manner, the dither combinations shown in table 1 (example 1) and table 2 (example 2) are preferable and novel combinations in terms of color moiré. Further, as evident from the result of the image output experiment, a high-quality image output preferable in terms of color moiré is verified.

(Comparative Experiment 2)

The following describes comparative experiment 2 conducted by the inventors. In comparative experiment 2, an image output experiment was conducted with the use of the same experimental device (converted based on Ricoh IPSiO Color 5100) as in comparative experiment 1.

Comparative experiment 2 was conducted in terms of accuracy of surface tilt in the polygon scanner (polygon mirror) of the above-mentioned experimental device. In an experimental method, there were prepared a polygon scanner proved to have relatively good accuracy in terms of surface tilt and a polygon scanner having relatively poor accuracy in terms of surface tilt, and abnormal images appeared in output images were evaluated by visual observation.

An experimental device used in comparative example 2 had one light source (semiconductor laser) for each of the CMYK colors and the polygon mirror had six reflection surfaces. Thus, when the above-mentioned polygon scanner having relatively poor accuracy in terms of surface tilt was used, the writing position was changed in the sub-scanning direction with a period of six pixels. In comparative experiment 2, "surface tilt moiré" generated from interference of the change of the writing position in the sub-scanning direction and the periodic structure of dithering was evaluated by visual observation. In the evaluation of the surface tilt moiré, an SCID-N1 chart, which was an integrated chart, was used for an output image and the evaluation was conducted by examining an entire image based on visual observation using the following indexes.

○: Surface tilt moiré is not noticeable at all

Δ: Surface tilt moiré is generated but not very noticeable

X: Surface tilt moiré is generated and noticeable

Further, in comparative experiment 2, images were output with the use of the dither sets shown in table 1 (example 1) and table 2 (example 2) and dither sets in comparative examples 4 and 5 shown in the following. In addition, table 7 (comparative example 4) shows a dither set that employs only those dot screen types for all the four CMYK colors (other dither sets described in the specification including table 8 are dither sets of line screen types).

TABLE 7

| No. | ruling | angles | a0x | a0y | a1x | a1y |
|---|---|---|---|---|---|---|
| Y | 200.0 | 0.0 | 3 | 0 | 0 | −3 |
| C | 189.7 | 71.6 | 1 | 3 | 3 | −1 |
| M | 212.1 | 45.0 | 2 | 2 | 2 | −2 |
| K | 189.7 | 18.4 | 3 | 1 | 1 | −3 |

Dither Set of Comparative Example 4 (Screen Ruling and Screen Angles of Dithering for YCMK Colors)

(Dither Set that Employs Only Those Dot Screen Types for all the Four CMYK Colors)

TABLE 8

| No. | ruling | angles | a0x | a0y | a1x | a1y |
|---|---|---|---|---|---|---|
| Y | 200.0 | 0.0 | 3 | 0 | 0 | −3 |
| C | 189.7 | 161.6 | −3 | 1 | 1 | 3 |
| M | 212.1 | 135.0 | −2 | 2 | 2 | 2 |
| K | 189.7 | 108.4 | −1 | 3 | 3 | 1 |

Dither Set of Comparative Example 5 (Screen Ruling and Screen Angles of Dithering for YCMK Colors)

Table 9 shows an evaluation result of an image output experiment based on visual observation regarding the generation of surface tilt moiré relative to the accuracy of the polygon scanners in terms of surface tilt.

TABLE 9

| Example number | polygon scanner with good accuracy in terms of surface tilt | polygon scanner with poor accuracy in terms of surface tilt | Comments |
|---|---|---|---|
| Example 1 (table 1) | ○ | ○ | Surface tilt moiré is unnoticeable |
| Example 2 (table 2) | ○ | ○ | Surface tilt moiré is unnoticeable |
| Comparative example 4 (table 7) | ○ | X | Surface tilt moiré is noticeable in C and M colors |
| Comparative example 5 (table 8) | ○ | X | Surface tilt moiré is noticeable in C color |

Evaluation Result of Surface Tilt Moiré Based on Visual Observation Regarding Output Images in Examples 1 and 2 and Comparative Examples 4 and 5

As understood from the result of evaluation based on visual observation in table 9, in accordance with the dither combinations shown in table 1 (example 1) and table 2 (example 2), it is possible to obtain preferable output images with no generation of surface tilt moiré even in the case of relatively poor accuracy in terms of surface tilt. By contrast, in accordance with the combinations shown in table 7 (comparative example 4) and table 8 (comparative example 5), although there is no problem in the case of relatively good accuracy in terms of surface tilt, surface tilt moiré is recognized in the case of relatively poor accuracy in terms of surface tilt and image quality is degraded.

In this manner, the dither combinations shown in table 1 (example 1) and table 2 (example 2) are preferable in terms of color moiré and hardly generate surface tilt moiré even in the case of relatively poor accuracy in terms of surface tilt. In other words, as evident from the result of the image output experiment, a high-quality image output preferable in terms of color moiré and surface tilt moiré is verified.

Example 3

Figure 9:
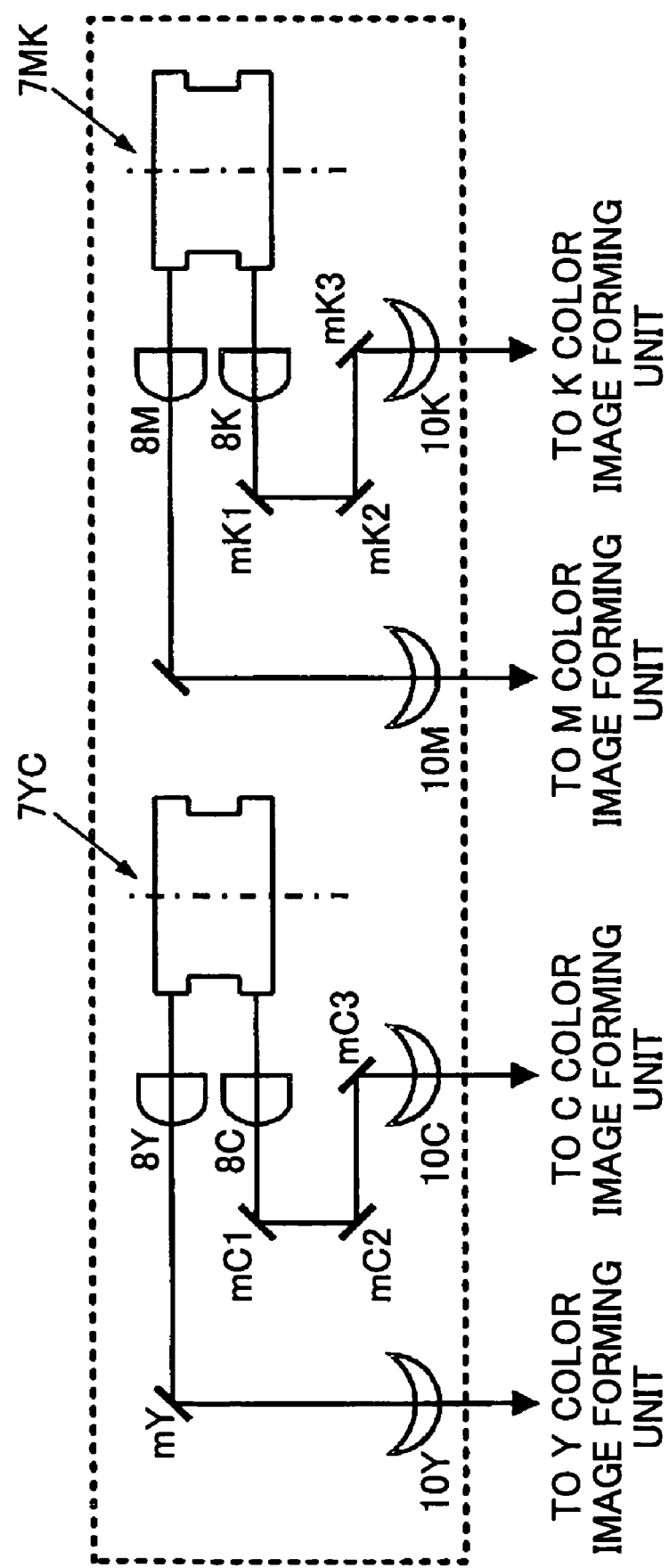
FIG. 9 is a diagram showing optical paths of an optical device (laser optical unit) in example 3.

FIG. 9 is a diagram showing a structure of a laser optical unit in example 3. In example 3, two polygon scanners (7YC and 7MK) are used as shown in FIG. 9.

Example 4

Figure 10:
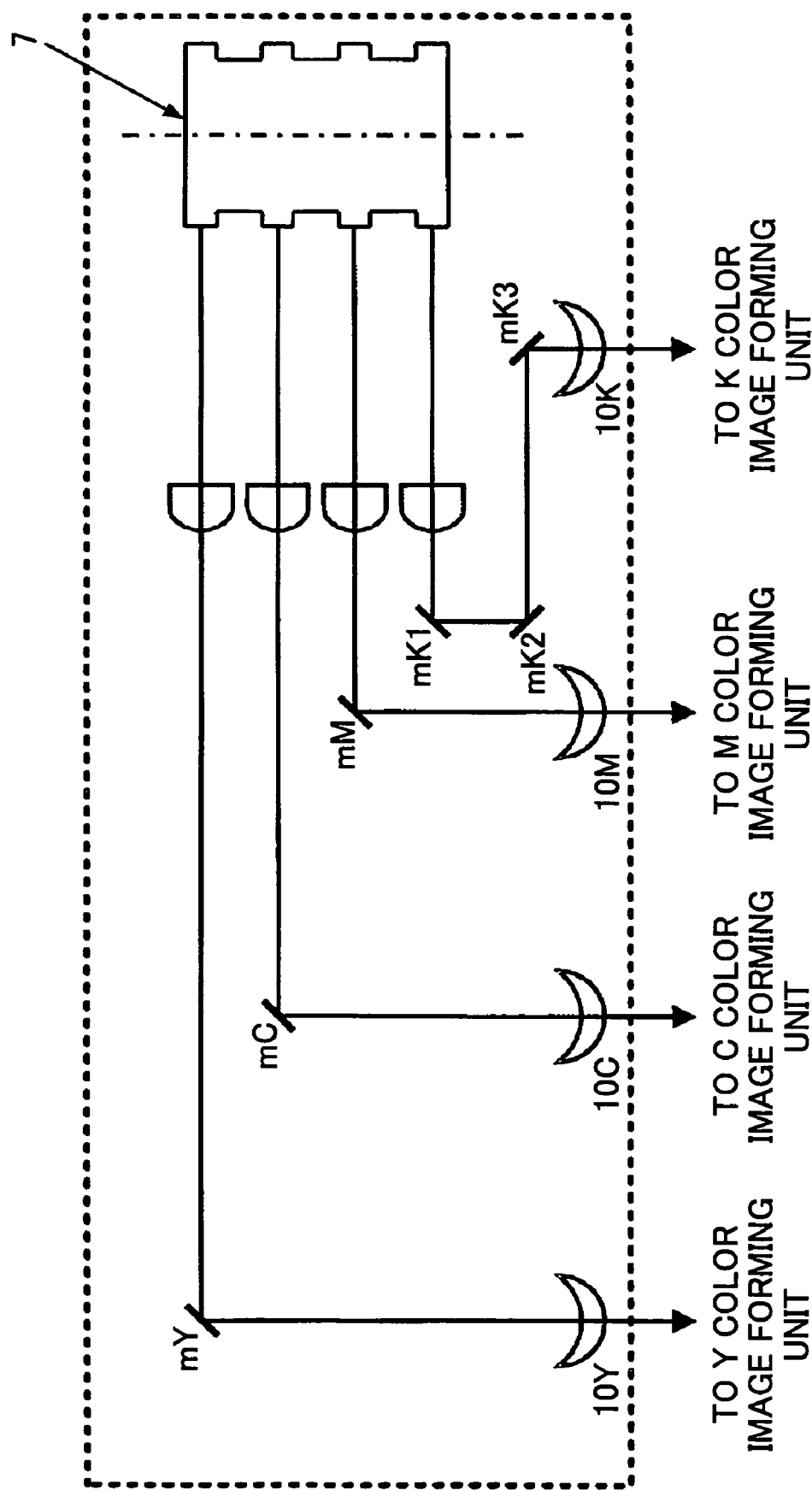
FIG. 10 is a diagram showing optical paths of an optical device (laser optical unit) in example 4.

FIG. 10 is a diagram showing a structure of a laser optical unit in example 4. In example 4, a polygon scanner is disposed on an end portion of the optical unit as shown in FIG. 10.

Example 5

Figure 11:
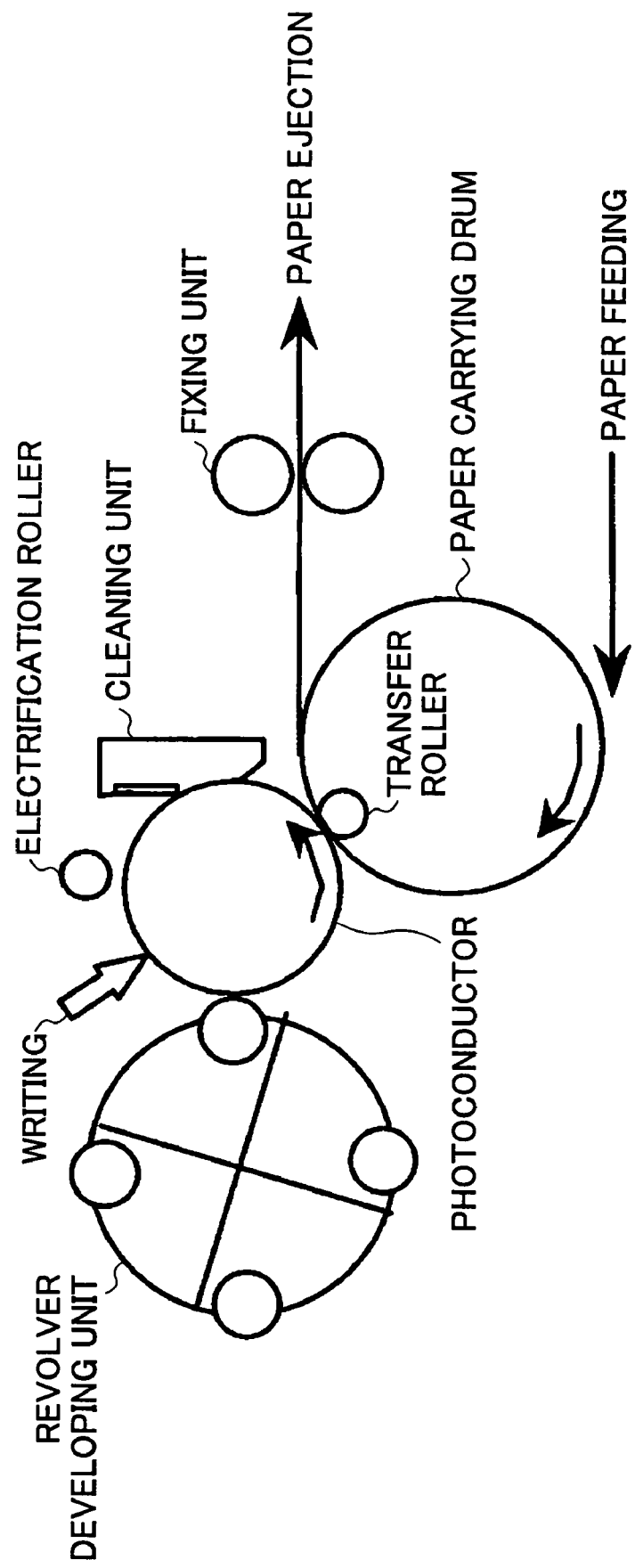
FIG. 11 is a diagram showing a structure of an image forming apparatus in example 5.

FIG. 11 is a diagram showing an image forming apparatus in example 5. In example 5, a full-color image forming apparatus includes what is called a revolver-type developing unit. Such a revolver-type image forming apparatus includes a single photoconductor drum differing from the apparatus in example 1 and performs an imaging operation for the four CMYK colors using the single photoconductor drum.

Example 6

In example 6, the combinations of the dither matrices shown in table 1 (example 1) and table 2 (example 2) are used as combinations for dither processing (netting) for the CMYK colors in an offset imaging device (printing machine). Although examples of embodiments of the present invention are described based on electrophotographic image forming apparatuses, it is possible to obtain the same effects (preferable in terms of color moiré with no generation of surface tilt moiré when the change of a laser scan writing position is generated with a period of six pixels) when an embodiment of the present invention is applied to dither processing in general printing machines (offset printing).

Example 7

In one embodiment of the present invention, screen ruling and screen angles in periodic structures of dithering are defined in table 1 and table 2. However, depending on the definition of a coordinate system (directions of positive and negative angles and definition of 0 angle position), it is possible to define the screen angles with several values. However, absolute values of such screen angles are not very significant in terms of the embodiments of the present invention. The relationship of relative screen angles in four dither patterns is more important in order to prevent the generation of color moiré. Thus, if dither patterns are different from those described in FIG. 1 or FIG. 8, a dither set having screen angles corresponding to those in table 1 or table 2 depending on the definition of a coordinate system is within the scope of the present invention.

Example 8

Although the image processing device in example 1 performs dither processing on an input image and outputs a result thereof as mentioned above, other image processing may be incorporated in the image processing device. In other words, pseudo-halftone processing other than the dither processing may be used in order to create periodic toner images defined in table 1 or table 2. In one example of such a pseudo-halftone processing method, a threshold table having information on periodic structures defined in table 1 or table 2 is used in threshold value portions in error diffusion processing.

The present invention is not limited to the specifically disclosed embodiment, and variations and modifications may be made without departing from the scope of the present invention.

What is claimed is:

1. An image forming apparatus for recording images, comprising:
    an image processing unit to create image data for output including toner image data on four colors of yellow, cyan, magenta, and black such that toner images have line-shaped periodic structures; and
    an image forming unit to form the toner images using coloring materials of the four colors and superposing the toner images on a recording medium, wherein
    the line-shaped periodic structures of the toner images of the four colors are determined based on a combination of periodic structures having screen ruling and screen angles specified in table 1 below:

TABLE 1

| No. | ruling | angles | a0x | a0y | a1x | a1y |
|-----|--------|--------|-----|-----|-----|-----|
| 0 | 180.3 | 33.7 | 3 | 2 | 3 | −2 |
| 1 | 180.3 | 146.3 | −3 | 2 | 3 | 2 |
| 2 | 200.0 | 0.0 | 3 | 0 | 0 | −3 |
| 3 | 200.0 | 90.0 | 0 | 3 | 3 | 0 | where four values of a0x, a0y, a1x, and a1y correspond to x component, y component of a main vector and x component, y component of a sub-vector, respectively, and the four colors are designated to No. 0 to No. 3.

2. The image forming apparatus according to claim 1, wherein
    the toner images are recorded on a recording medium using an electrophotographic recording method.

3. The image forming apparatus according to claim 1, including:
    an optical writing/reading device to form an electrostatic latent image by allowing beams from light sources to reflect on a polygon mirror and scanning a latent image carrying body, wherein
    a resolution of the optical writing/reading device in a sub-scanning direction is 600 dpi and the number (N) of the light sources used to form a single color toner image and the number (M) of reflection surfaces of a polygon mirror satisfy an equality: N×M=6.

4. An image forming apparatus for recording images, comprising:
    an image processing unit to create image data for output including toner image data on four colors of yellow, cyan, magenta, and black such that toner images have line-shaped periodic structures; and
    an image forming unit to form the toner images using coloring materials of the four colors and superposing the toner images on a recording medium, wherein
    the line-shaped periodic structures of the toner images of the four colors are determined based on a combination of periodic structures having screen ruling and screen angles specified in table 2 below:

TABLE 2

| No. | ruling | angles | a0x | a0y | a1x | a1y |
|---|---|---|---|---|---|---|
| 0 | 180.3 | 33.7 | 3 | 2 | 3 | −2 |
| 1 | 180.3 | 146.3 | −3 | 2 | 3 | 2 |
| 2 | 189.7 | 108.4 | −1 | 3 | 3 | 1 |
| 3 | 200.0 | 0.0 | 0 | 0 | 0 | −3 | where four values of a0x, a0y, a1x, and a1y correspond to x component, y component of a main vector and x component, y component of a sub-vector, respectively, and the four colors are designated to No. 0 to No. 3.

5. The image forming apparatus according to claim 4, wherein the toner images are recorded on a recording medium using an electrophotographic recording method.

6. The image forming apparatus according to claim 4, including:

an optical writing/reading device to form an electrostatic latent image by allowing beams from light sources to reflect on a polygon mirror and scanning a latent image carrying body, wherein a resolution of the optical writing/reading device in a sub-scanning direction is 600 dpi and the number (N) of the light sources used to form a single color toner image and the number (M) of reflection surfaces of a polygon mirror satisfy an equality: N×M=6.

7. An image forming method for recording images, comprising:

forming toner images using four coloring materials of yellow, cyan, magenta, and black such that the toner images have line-shaped periodic structures; and superposing the toner images on a recording medium, wherein the line-shaped periodic structures of the toner images of the four colors are determined based on a combination of periodic structures having screen ruling and screen angles specified in table 3 below:

TABLE 3

| No. | ruling | angles | a0x | a0y | a1x | a1y |
|---|---|---|---|---|---|---|
| 0 | 180.3 | 33.7 | 3 | 2 | 3 | −2 |
| 1 | 180.3 | 146.3 | −3 | 2 | 3 | 2 |
| 2 | 200.0 | 0.0 | 3 | 0 | 0 | −3 |
| 3 | 200.0 | 90.0 | 0 | 3 | 3 | 0 | where four values of a0x, a0y, a1x, and a1y correspond to x component, y component of a main vector and x component, y component of a sub-vector, respectively, and the four colors are designated to No. 0 to No. 3.

8. The image forming method according to claim 7, wherein recording the toner images on a recording medium is performed using an electrophotographic recording method.

* * * * *